US007142652B2

United States Patent
Ho

(10) Patent No.: US 7,142,652 B2
(45) Date of Patent: Nov. 28, 2006

(54) APPARATUS AND METHOD TO IDENTIFY POTENTIAL WORK-AT-HOME CALLERS

(75) Inventor: Jeremy Ho, Sacramento, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 375 days.

(21) Appl. No.: 10/627,292

(22) Filed: Jul. 25, 2003

(65) Prior Publication Data

US 2005/0018825 A1    Jan. 27, 2005

(51) Int. Cl.
*H04M 15/00*    (2006.01)
(52) U.S. Cl. ............... 379/133; 379/126; 379/114.01; 379/112.01
(58) Field of Classification Search ............. 379/111, 379/112.01, 112.05, 114.01, 114.08, 114.09, 379/121.01, 126, 127.01, 128, 133–134, 379/32.01, 32.02, 119, 121.05
See application file for complete search history.

(56) References Cited

U.S. PATENT DOCUMENTS

| 6,351,453 | B1* | 2/2002 | Nolting et al. ............... 370/234 |
| 6,580,788 | B1* | 6/2003 | Koehler ................. 379/112.06 |
| 2002/0099806 | A1* | 7/2002 | Balsamo et al. ............ 709/223 |

FOREIGN PATENT DOCUMENTS

WO    WO 02/13497 A1 *   2/2002

\* cited by examiner

*Primary Examiner*—Quoc Tran

(57) ABSTRACT

A method of identifying work at home users of a telecommunications network based on call detail records. The phone numbers of the work at home users are identified from call detail records that exhibit characteristics of work at home users. In one embodiment this involves selecting records describing calls to phone numbers of known Internet Service Providers; excluding records describing calls less than a predetermined length of time; excluding records containing originating numbers with records describing calls to an ISP that occur on weekends; and excluding records containing originating numbers with records describing calls to an ISP that occur outside normal business hours.

19 Claims, 4 Drawing Sheets

APPARATUS AND METHOD TO IDENTIFY POTENTIAL WORK-AT-HOME CALLERS

BACKGROUND OF THE INVENTION

In modern switched telecommunications systems (in particular, modern PSTNs) it has become common practice to provide two related but separate network infrastructures: a bearer or transmission network for carrying end-user voice and data traffic, and a signaling network for controlling the setup and release of bearer channels through the bearer network in accordance with control signals transferred through the signaling network. In practice, such signaling networks comprise high-speed computers interconnected by signaling links, wherein procedures control the computers to provide a set of operational and signaling functions in accordance with a standardized protocol. One example of such a signaling protocol is the Common Channel Signaling System No. 7 (often referred to as SS7 or C7) that is being extensively deployed for control of telephone and other data transmission networks.

SS7 is a global standard for telecommunications defined by the International Telecommunication Union (ITU) Telecommunication Standardization Sector (ITU-T). The standard defines the procedures and protocol by which network elements in the public switched telephone network (PSTN) exchange information over a digital signaling network to effect wireless (cellular) and wireline call setup, routing and control. The ITU definition of SS7 allows for national variants such as the American National Standards Institute (ANSI) and Bell Communications Research (Telcordia Technologies) standards used in North America and the European Telecommunications Standards Institute (ETSI) standard used in Europe.

An SS7 network basically comprises various types of signaling points, namely, Signaling End Points (SEPs), for example an end office or local exchange, and Signaling Transfer Points (STPs) interconnected by signaling links. The SEPs typically comprise Signaling Switching Points (SSPs); Mobil Switching Centers (MSPs); and Service Control Points (SCPs).

The signaling information is passed over the signaling links in messages, which are called signal units (SUs). There are three types of SUs: message signal units (MSUs), link status signal units (LSSUs) and fill-in signal units (FISUs). The MSU is the workhorse in that signaling associated with call setup and tear down, database query and response, and SS7 management is carried by Message Signal Units (MSUs).

Many switches, including SS7 compliant switches, generate Call Detail Records (CDRs) which are data structures containing information about a call. CDRs are analyzed to provide information that can assist with service assurance, fulfillment and billing problems.

Non-SS7 switches generate CDRs by monitoring the actual call and typically have a vendor specified format. Know SS7 operations support systems (OSS systems), such as the AGILENT TECHNOLOGIES ACCESS7 system, extract data from the MSUs to generate Call detail Records (CDRs). Because the data collection is independent of the network elements, SS7 CDRs may be presented in a consistent format across various OSS systems. In fact, there is at least one serious attempt to standardize the format of SS7 CDRs. This interoperability, among other benefits, has spurred the growth of SS7 networks and has led to an increasing amount of traffic over SS7 networks. As the volume of CDRs increases, users seek to extract more and more useful information from the data contained in the CDRs.

The desire for advanced analysis of CDRs has lead to the creation of a class of systems, termed Business Intelligence systems (BI systems), such as the Agilent Technologies, Inc. acceSS7 Business Intelligence system, that provide enrichment and analytical studies on CDRs. Known BI systems analyze SS7 CDRs to provide a variety of information about the SS7 network, for example: identification of signaling problems, location of network problems, service assurance data, billing data, quality of service monitoring, regulatory monitoring, and verifying compliance of inter-carrier agreements regarding billing and service level.

The differentiator between competing OSS and BI systems is the ability of the system to reduce operating cost or generate revenue for the users, including Local Exchange Carriers (LECs) and Inter-exchange Carriers (IXCs). To date, most of the focus of development has been on identifying problems with the network and verifying billing data. The present inventors have identified method and apparatus for deriving marketing data from collected SS7 CDRs that allows the targeting of customers for new services.

BRIEF DESCRIPTION OF THE DRAWINGS

An understanding of the present invention can be gained from the following detailed description of the invention, taken in conjunction with the accompanying drawings of which.

DETAILED DESCRIPTION

Figure 1:
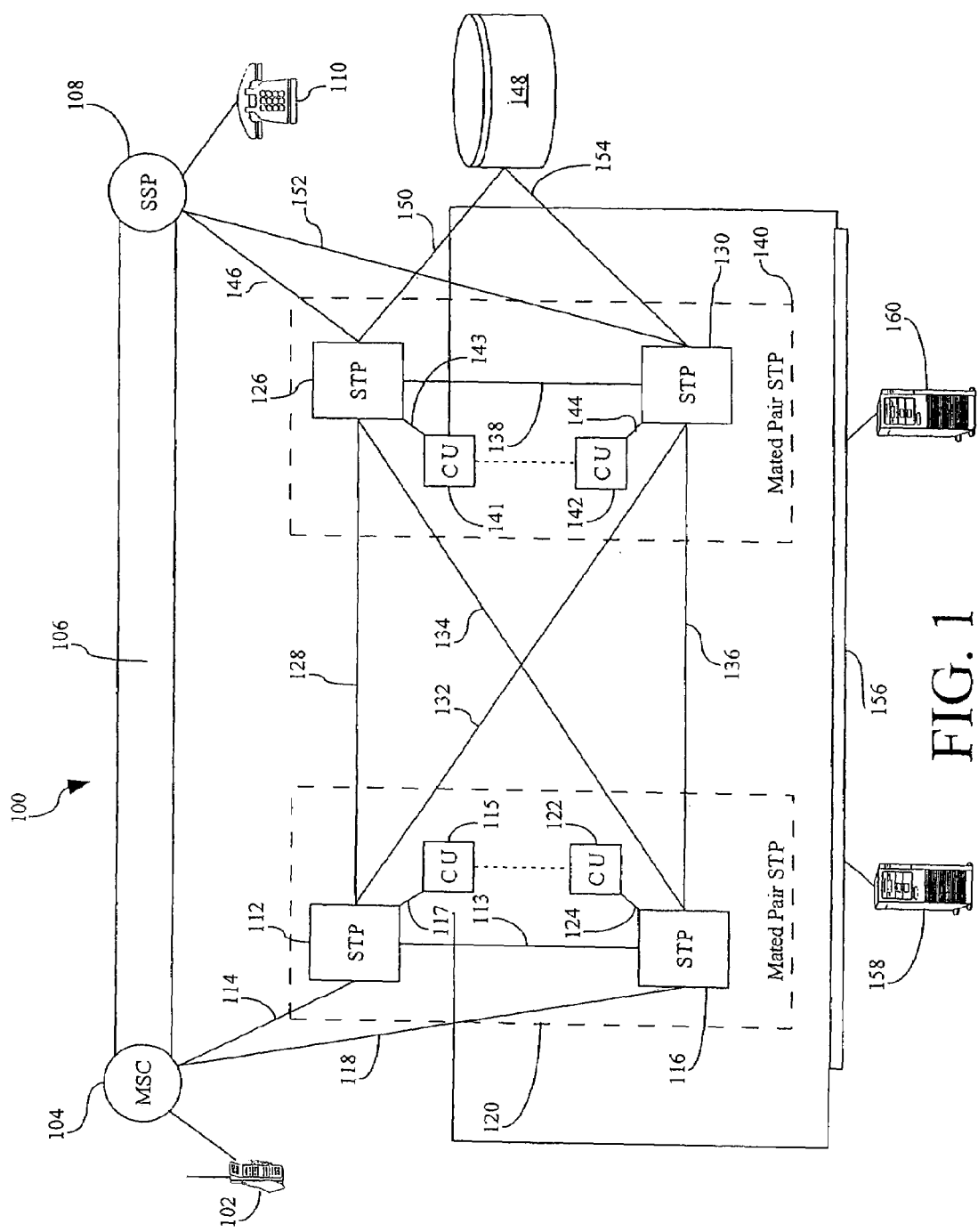
FIG. 1 is a block diagram of a signaling network.

Reference will now be made in detail to the present invention, examples of which are illustrated in the accompanying drawings, wherein like reference numerals refer to like elements throughout.

The detailed description that follows is presented in terms of general procedures and symbolic representations of operations of data within a computer memory, associated computer processors, networks, and network devices. These procedure descriptions and representations are the means used by those skilled in the data processing art to convey the substance of their work to others skilled in the art. As used herein the term "procedure" refers to a series of operations performed by a processor, be it a central processing unit of a computer, or a processing unit of a network device, and as such, encompasses such terms of art as: "software," "objects," "functions," "subroutines" and "programs."

The apparatus set forth in the present application may be specifically constructed for the required purposes or it may comprise a general-purpose computer or terminal selectively activated or reconfigured by a computer program stored in the computer. The procedures presented herein are not inherently related to any particular computer or other apparatus. In fact, many of the procedures described herein may be implemented on a general-purpose computing device.

The present invention, as described, can be implemented using AGILENT's ACCESS7 OSS system, BI system, and associated hardware. The ACCESS7 OSS system integrates with and monitors an SS7 network as described above. Those of ordinary skill in the art will recognize that there exist other platforms and languages for creating software for performing the procedures outlined herein. Further, the present invention is useable with a variety of signaling systems. For example, the present invention can be implemented on any switched system that produces CDRs with the base data described herein. Those of ordinary skill in the art also recognize that the choice of the exact platform and language is often dictated by the specifics of the actual system constructed, such that what may work for one type of signaling system may not be efficient on another type of signaling system.

Figure 2:
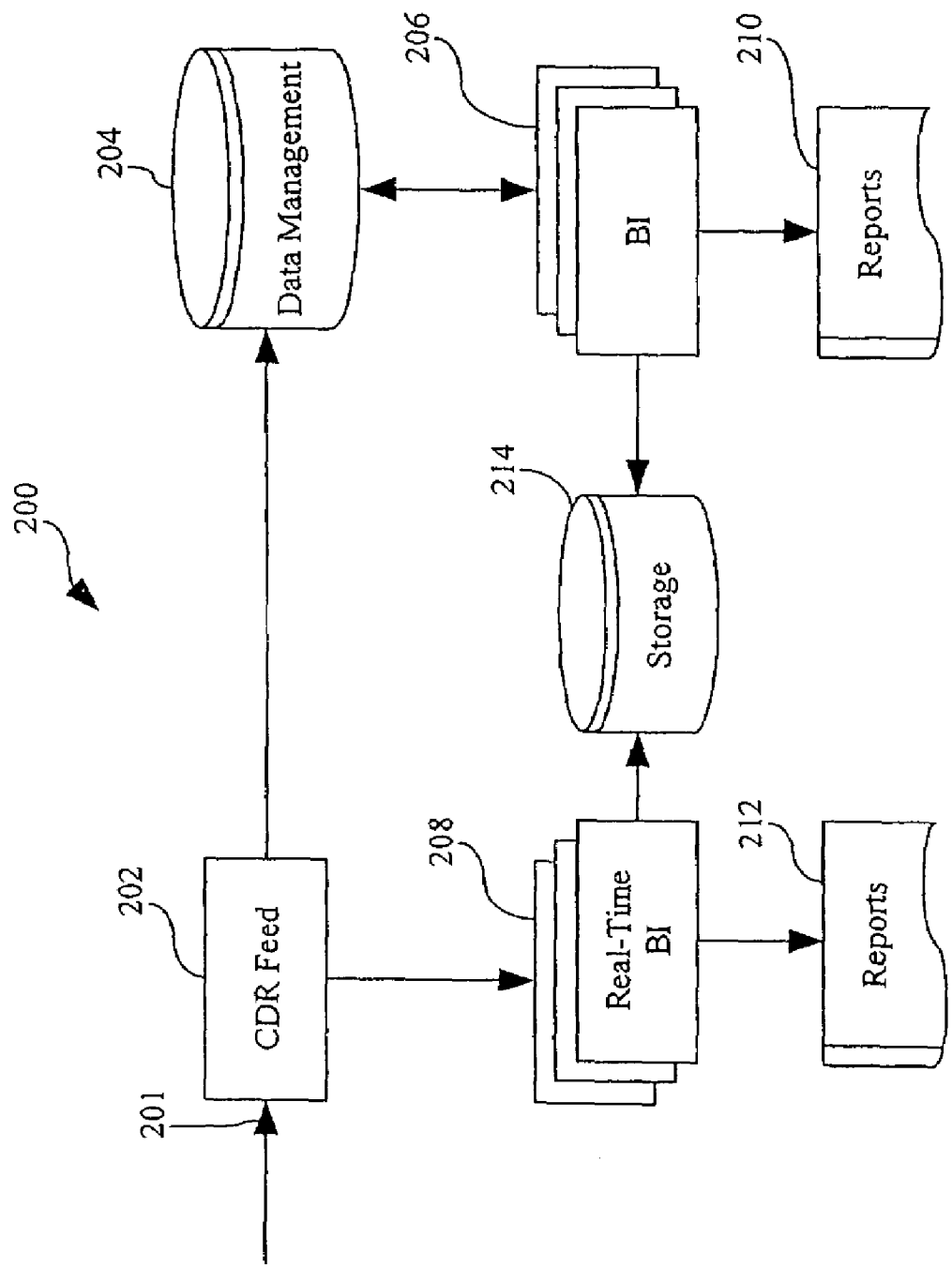
FIG. 2 is a block diagram of a Business Intelligence system in accordance with a preferred embodiment of the present invention.
Figure 3:
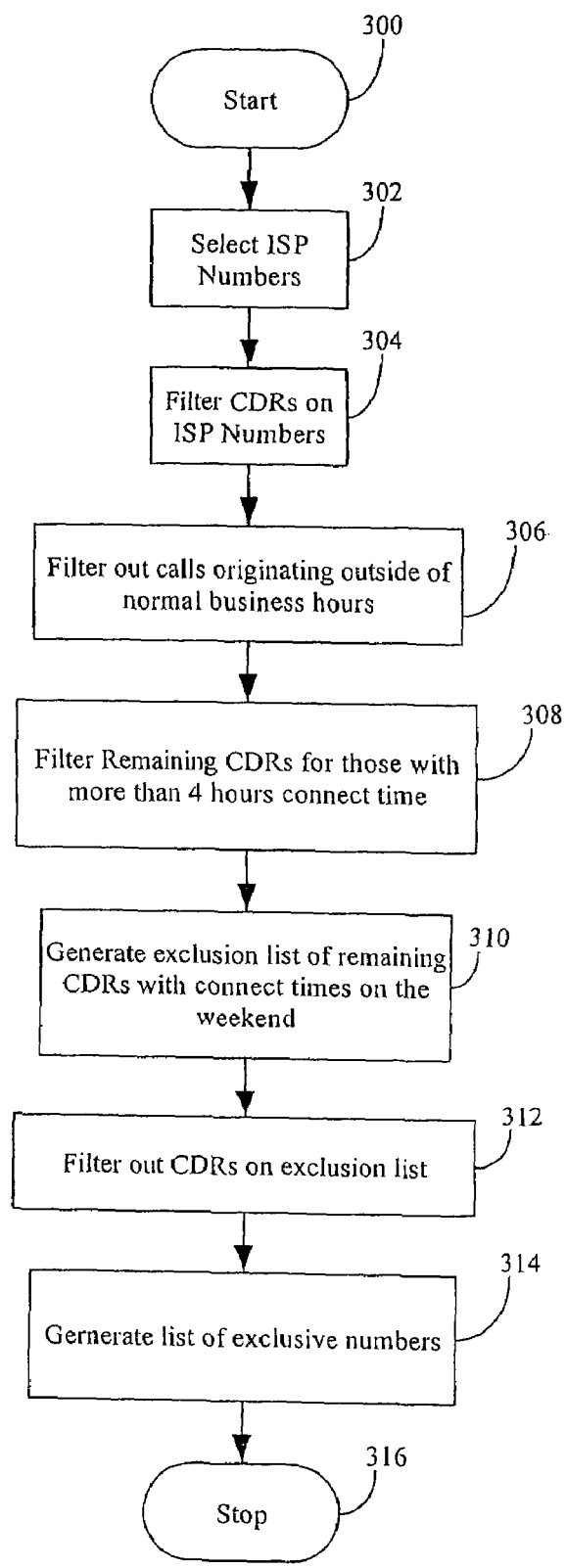
FIG. 3 is a flow chart of a method according to an embodiment of the present invention adapted to identify work-at-home users.

FIG. 1 is a block diagram of a signaling network 100. FIG. 2 is a block diagram of a Business Intelligence system (BI system) 200 in accordance with a preferred embodiment of the present invention. The structure illustrated in FIGS. 1 and 2 and the method illustrated in FIG. 3 emphasize certain features of the present invention while simplifying other features to aid in explanation. As such, the figures and associated discussion are to be regarded as illustrative and exemplary and not limiting as regards the invention described herein or the claims attached hereto. It will also be appreciated by those of ordinary skill in the relevant arts that the apparatus, as illustrated in FIGS. 1 and 2, and the methods of use thereof as described hereinafter with reference to FIG. 3, are intended to be representative of such structures and methods. Further, any given system may differ significantly from that shown, particularly in the details of construction and operation of such system, as still fall within the spirit and scope of the invention.

The signaling network 100 supports an SS7 signaling protocol and comprises a wireless network terminating device such as PCS handset 102 coupled to a MSC 104. The MSC 104 is capable of establishing a connection 106 with a SSP 108 and vice versa, the SSP 108 being coupled to a network-terminating device such as a telephone handset 110. The details of such connection are outside the scope of the present invention and are omitted to avoid obscuring the present invention.

The MSC 104 is coupled to a first STP 112 by a first A link 114 and a second STP 116 by a second A link 118. The first STP 112 is coupled to the second STP 116 by a first C link 113 and, together, the first and second STPs 112, 116 constitute a first mated pair of STPs 120. A first Agilent® acceSS7 Network Monitoring System (NMS) comprises a first secondary collector unit 122 and a first primary collector unit 115. The first primary collector unit 115 is, although not essentially, co-located with the first STP 112 and coupled to first links (not shown) provided by the first STP 112 by a first number of electrical connections 117 corresponding to the first links. Similarly, although not essentially co-located, in this example the first secondary collector unit 122 is co-located with the second STP 116 and coupled to second links (not shown) provided by the second STP 116 by a second number of electrical connection 124 corresponding to the second links.

The first STP 112 is coupled to a third STP 126 by a first B link 128 and a fourth STP 130 by a second B link 132. The second STP 116 is also coupled to the third STP 126 by a third B link 134 and the fourth STP 130 by a fourth B link 136. The third STP 126 is coupled to the fourth STP 130 by a second C link 138 and, together, the third and fourth STPs 126, 130 constitute a second mated pair of STPs 140. The third STP 126 is coupled to the SSP 108 by a third A link 146 and an SCP 148 by a fourth A link 150. The fourth STP 130 is also coupled to the SSP 108 and the SCP 148, but by a fifth A link 152 and a sixth A link 154, respectively.

A second Agilent® acceSS7 NMS comprises a second primary collector unit 141 and a second secondary collector unit 142. For the purposes of the present invention, the structure of the second primary collector 141 may be considered (although not always) identical to the structure of the first primary collector 115 and the structure of the second secondary collector 142 may be considered (although not always) identical to the structure of the first secondary collector 122. The second primary collector unit 141, although not essentially, is co-located with the third STP 126 and coupled to third links (not shown) provided by the third STP 126 by a third number of electrical connection 143 corresponding to the third links. Similarly, although not essentially co-located, in this example the second secondary collector unit 142 is co-located with the fourth STP 130 and coupled to fourth links (not shown) provided by the fourth STP 130 by a fourth number of electrical connection 144 corresponding to the fourth links.

The first and second primary collectors 115 and 141 are coupled to a wide area network (WAN) 156 through which connections to any number and variety of computing devices can be made. In the example shown in FIG. 1, two servers, 158 and 160, are shown. Generally, the collectors 115, 122, 141, and 142 collect data regarding messaging traffic on the SS7 network and create CDRs. Analysis of the CDRs can be performed by any number of capable units, for example the collectors 115, 122, 141, and 142 along with any computing device connected to the WAN 156, such as the servers 158 and 160.

FIG. 2 is a block diagram of a Business Intelligence (BI) system 200 in accordance with a preferred embodiment of the present invention. While shown as a single logical entity, the BI system 200 may be physically distributed, or centralized, to any available storage and processor resources connected to the network. It may prove useful to distribute the functions of the BI system 200 among the first and second primary collectors 115 and 141 and at least one server, such as the server 158.

The BI system 200 receives Call Detail Record (CDRs) from a CDR feed 202. The CDR feed 202 is connected to a network (not shown), such as the SS7 network shown in FIG. 1, via connection 201. In the example shown in FIG. 2, the CDR feed 202 is embodied in software and is programmable to configure, manage and control the collection and delivery of CDRs from the SS7 network. The CDR feed 202 can be configured to collect data from a single site, a number of sites or network-wide.

The CDR feed 202 feeds CDRs to one or more Data Management Components (DMC) 204, where the data is stored. This DMC 204 provides data storage and management for CDRs delivered by the CDR Feed 202. Using the Agilent Technologies' ACCESS7 OSS as an example, the DMC 204 provides a consistent open interface for a wide range of acceSS7 Business Intelligence applications, enabling them to be designed independently of the underlying network infrastructure. While only a single DMC 204 is shown, it is fairly typically to set up a plurality of DMCs 204. For example, it is not uncommon to assign an individual DMC 204 for each separate yet concurrent analysis tasks or for each business unit. DMCs are known by a variety of names, which varies by vendor, such as a data management center, data management system, management site, etc . . . The CDR feed 202 and the DMC 204 are known parts of the Agilent® acceSS7 and will not be described further.

Business Intelligence applications 206 and Real-Time Business Intelligence applications 208 are sets of procedures that turn raw data into business information. The Business Intelligence applications 206 sit on top of the DMC and process the CDR data in large batches, typically every 24 hours. However, some requirements can only be met with data available in real-time. In some cases this can be accomplished by reducing the batch collection time, to say five minutes. If true real-time is required, the Real-Time BI applications 208 are configured to accept a direct feed from the CDR Feed 202. The BI applications 206 and Real-Time BI applications 208 output a variety of reports 210 and 212 respectively. The report varies with each application 206 and 208, and based on the function thereof. Additionally, the BI applications 206 and Real-Time BI applications 208 may be provided with dedicated storage space 214, for example of any of the servers 158, 160 connected to the network.

Currently, a wide variety of BI application and Real-Time BI applications are available from AGILENT TECHNOLOGIES. For example, an Interconnect Analysis application performs direct, accurate measurements of inter-carrier traffic, with measures of total calls and total MOU for each jurisdiction (e.g. local, toll, etc.). Bills and Rating Factors submitted by interconnecting carriers for jurisdictional reporting on originating, terminating and transit traffic can be validated and hard evidence provided with which to challenge estimates. ISP traffic can be identified and reported separately, which supports both separate rates for ISP traffic and the generation of data with which to build a case for ISP tariffs. Another BI application, the Call Performance Manager, provides detailed data on the call completion performance of interconnected carriers, including performance to specific destinations and services identified by leading digits. Yet another example is the Traffic Analysis application that provides detailed analysis of traffic flows between parts of the network with analysis by geographic region.

Of particular relevance to at least one embodiment of the present invention is the ISP Finder. The ISP finder is a BI application that identifies ISPs on a connected network and on interconnected networks by matching the call profile of every called number against the typical profile of ISPs. This data is currently used for network planning purposes by identifying a major source of network congestion.

An understanding of the type of data contained in a CDR may prove helpful to understand the present invention. Table 1 is an example of a CDR specification used by business intelligence applications associated with AGILENT's ACCESS7 OSS.

TABLE 1

| Field Name | Description |
| --- | --- |
| CDR_DATE | The date that the CDR was loaded into the repository. |
| CDR_ID | A sequence numbers for the CDR. This can be used to link this table row to a row in another table. This is useful for enriching a CDR with rating information, etc. |
| DMC_ID | Each Data Management Center (DMC) in the world has an identifier that is encrypted in the product activation license. Tagging a CDR with this identifier allows the originating DMC to be determined in situations where data is handed off between DMC systems. |
| PARTITION_ID | Each Oracle partition has an identifier. This field is used primarily to bin CDRs into the correct partition and has little user value. |
| STUDY_ID | A sequence number for a specific acceSS7 filter configuration over a specified period of time. Tagging a CDR with this identifier allows the determination of the exact acceSS7 configuration (filters, links...) that caused this CDR to be collected. |
| CLASS_ID | The acceSS7 class ID that is associated with this CDR. |
| SITE_ID | Specifies the acceSS7 site number that collected this CDR. |
| TIMEZONE | Specifies the time zone upon which all times in the CDR are based. |
| INCOMPLETE_FLG | A flag that specifies that acceSS7, was not able to completely populate the CDR. |
| CALL_IN_PROGRESS_FLG | A flag that specifies a call that is still in progress. |
| CALL_TIMEOUT_FLG | A flag that specifies that an acceSS7 timeout occurred before all parts of a call were collected. |
| REPEATING_CALL_IN_PROGRESS_FLG | |
| FORCED_DELIVERY_FLG | |
| OPC_1 | The 1st component of the originating point code. |
| OPC_2 | The 2nd component of the originating point code. |
| OPC_3 | The 3rd component of the originating point code. |
| DPC_1 | The 1st component of the destination point code. |
| DPC_2 | The 2nd component of the destination point code. |
| DPC_3 | The 3rd component of the destination point code. |
| CALLING_NUMPLAN | |
| CALLING_NPA | The NPA component of the calling number. |
| CALLING_NXX | The NXX component of the calling number. |
| CALLING_LINE | The LINE component of the calling number. |

TABLE 1-continued

| Field Name | Description |
| --- | --- |
| CALLING_INT_NUM | The entire calling number if the number is thought to be international. |
| CALLING_PARTY_CAT_CD | |
| CALLED_NPA | The NPA component of the called number. |
| CALLED_NXX | The NXX component of the called number. |
| CALLED_LINE | The LINE component of the called number. |
| CALLED_INT_NUM | The entire called number if the number is thought to be international. |
| CHARGE_NPA | The NPA component of the charge number. |
| CHARGE_NXX | The NXX component of the charge number. |
| CHARGE_LINE | The LINE component of the charge number. |
| CHARGE_INT_NUM | The entire charge number if the number is thought to be international. |
| CALLED_NUMPLAN | |
| IAM_DATE_TIME | The initial address message date/timestamp (nearest second). |
| IAM_MILLISEC | The initial address message timestamp (milliseconds component). |
| ANM_DATE_TIME | The answer message date/timestamp (nearest second). |
| ANM_MILLISEC | The answer message timestamp (milliseconds component). |
| REL_DATE_TIME | The release message date/timestamp (nearest second). |
| REL_MILLISEC | The release message timestamp (milliseconds component). |
| EXM_DATE_TIME | The exit message date/timestamp (nearest second). |
| EXM_MILLISEC | The exit message timestamp (milliseconds component). |
| ACM_DATE_TIME | The address completes message date/timestamp (nearest second). |
| ACM_MILLISEC | The address completes message timestamp (milliseconds component). |
| RLC_DATE_TIME | The release-clear message date/timestamp (nearest second). |
| RLC_MILLISEC | The release-clear message timestamp (milliseconds component). |
| IAM_REL_DUR | Time duration between IAM and REL messages (seconds). |
| IAM_REL_CCS | Time duration between IAM and REL messages (CCS). |
| ANM_REL_DUR | Time duration between ANM and REL messages (seconds). |
| ANM_REL_CCS | Time duration between ANM and REL messages (CCS). |
| CALLING_NATR_ADDR_CD | Acronym describing the context of the calling number derived from the calling nature of address indicator. |
| CALLING_NATR_ADDR_IND | Raw calling nature of address indicator. |
| CALLING_EVEN_ODD_FLG | Even/odd number of address signals for calling number. |
| CALLED_NATR_ADDR_CD | Acronym describing the context of the called number derived from the called nature of address indicator. |
| CALLED_NATR_ADDR_IND | Raw called nature of address indicator. |
| CALLED_EVEN_ODD_FLG | Even/odd number of address signals for called number. |
| CHARGE_NATR_ADDR_CD | Acronym describing the context of the charge number derived from the charge nature of address indicator. |
| CHARGE_NATR_ADDR_IND | Raw charge nature of address indicator. |
| CHARGE_EVEN_ODD_FLG | Even/odd number of address signals for charge number. |
| ORIG_LINE_CD | Represents toll class of service for the call. |
| CARRIER_ID_CD | Identifies the carrier selected by the caller. |
| CARRIER_SELECT_CD | Identifies how the caller selected a carrier. |
| TCIC | Trunk circuit identification code. |
| JURISDICTION | Numerical data indicating the geographic origination of the call. |
| BACKWD_CHARGE_CD | Backward charge indicator for called party. |
| BACKWD_CALLED_STAT_CD | Backward called party's status indicator. |
| BACKWD_CALLED_CAT_CD | Backward called party's category indicator. |
| BACKWD_END_TO_END_CD | Backward end-to-end method indicator. |
| BACKWD_INTERWORK_FLG | Backward interworking indicator. |
| BACKWD_IAM_SEG_FLG | Backward IAM segmentation indicator. |
| BACKWD_ISUP_FLG | Backward ISDN user part indicator. |
| BACKWD_HOLDING_FLG | Backward holding indicator. |
| BACKWD_ISDN_ACCESS_FLG | Backward ISDN access indicator. |
| BACKWD_ECHO_CNTL_FLG | Backward echo control device indicator. |

TABLE 1-continued

| Field Name | Description |
|---|---|
| BACKWD_SCCP_CD | Backward SCCP method indicator. |
| RELEASE_CAUSE_CD | Indicates the reason for releasing a specific connection. Note CDRs are generated for failed calls as well as successful calls. |
| RELEASE_LOC_CD | Indicates where the release was initiated. |
| TRANSIT_NETWORK_CD | Indicates the long distance carrier or transit network to be used to carry this call. This is used whenever the call is an inter-LATA call or international call. |
| ORIG_CALLED_NUMPLAN | |
| ORIG_CALLED_NPA | Used when call redirecting (forwarding) occurs. Identifies the NPA component of the number of the party that initiated the redirection. |
| ORIG_CALLED_NXX | Used when call redirecting (forwarding) occurs. Identifies the NXX component of the number of the party that initiated the redirection. |
| ORIG_CALLED_LINE | Used when call redirecting (forwarding) occurs. Identifies the LINE component of the number of the party that initiated the redirection. |
| ORIG_CALLED_INT_NUM | Used when call redirecting (forwarding) occurs. Identifies the entire number of the party that initiated the redirection if this number is thought to be international. |
| ORIG_CALLED_NATR_ADDR_IND | Raw original called number nature of address indicator. |
| REDIRECT_NPA | Used when call redirecting (forwarding) occurs. Identifies the NPA component of the number to which the called number is to be redirected. |
| REDIRECT_NXX | Used when call redirecting (forwarding) occurs. Identifies the NXX component of the number to which the called number is to be redirected. |
| REDIRECT_LINE | Used when call redirecting (forwarding) occurs. Identifies the LINE component of the number to which the called number is to be redirected. |
| REDIRECT_INT_NUM | Used when call redirecting (forwarding) occurs. Identifies the number to which the called number is to be redirected if this number is thought to be international. |
| REDIRECT_NATR_ADDR_IND | Raw redirecting number nature of address indicator. |
| ORIG_REDIRECT_REASON_CD | Indicates the reason the original redirection occurred. |
| REDIRECT_REASON_CD | Indicates the reason for subsequent redirection. |
| REDIRECT_COUNT | Indicates the number of redirections that have occurred. |
| FORWD_IN_INT_CALL_FLG | Forward incoming international call indicator. |
| FORWD_END_TO_END_CD | Forward end-to-end method indicator. |
| FORWD_INTERWORK_FLG | Forward interworking indicator. |
| FORWD_IAM_SEG_ | FLG Forward IAM segmentation indicator. |
| FORWD_ISUP_FLG | Forward ISDN user part indicator. |
| FORWD_ISUP_PREF_CD | Forward ISDN user part preference indicator. |
| FORWD_ISDN_ACCESS_ | FLG Forward ISDN access indicator. |
| FORWD_SCCP_CD | Forward SCCP method indicator. |
| FORWD_PORTED_NUM_FLG | Forward ported number translation indicator. |
| LRN_NPA | Used with Local Number Portability (LNP). Indicates the NPA component of the local routing number. |
| LRN_NXX | Used with Local Number Portability (LNP). Indicates the NXX component of the local routing number. |
| LRN_LINE | Used with Local Number Portability (LNP). Indicates the LINE component of the local routing number. |
| LRN_INT_NUM | Used with Local Number Portability (LNP). Identifies the local routing number if this number is thought to be international. |
| GAP_NPA | Indicates the NPA component of the Generic Address Parameter (GAP) number. When LNP is provided, the GAP provides the actual dialed digits for a ported number. |
| GAP_NXX | Indicates the NXX component of the Generic Address Parameter (GAP) number. When LNP is provided, the GAP provides the actual dialed digits for a ported number. |
| GAP_LINE | Indicates the LINE component of the Generic Address Parameter (GAP) number. When LNP is provided, the GAP provides the actual dialed digits for a ported number. |
| GAP_INT_NUM | Indicates the Generic Address Parameter (GAP) number if the number is thought to be international. When LNP is provided, the GAP provides the actual dialed digits for a ported number. |

TABLE 1-continued

| Field Name | Description |
| --- | --- |
| GAP_TYPE_OF_ADDR_IND | Indicates the type of address contained in the Generic Address Parameter (GAP). |
| GAP_NATR_OF_ADDR_IND | Raw Generic Address Parameter (GAP) nature of address indicator. |
| OUT_TRUNK_GROUP_NUM | Outgoing trunk group number. |
| SERVICE_CODE_CD | Service code assigned by the North American Numbering Plan Administration. Can be used to identify a specific type of service. |
| CIP_SEQ_NUM | This is a number assigned sequentially from 0 for each CDR pertaining to the same leg of the same call. For example, if RCIP/CIP CDRs are configured, the first CIP CDR has a sequence number of 0, the first RCIP CDR has a sequence number of 1, the second RCIP CDR has a sequence number of 2 and so on. With CIP CDRs, but no RCIP CDRs, the CIP CDR has a sequence number of 0 and the final CDR a sequence number of 1. With no CIP CDRs at all, the final CDR has a sequence number of 0. |
| CIP_CORRELATION_ID | This is an identifier which is the same for all CIP CDRs which apply to the same leg of the same call (and different from all other CIP CDRs) |
| CIP_START_TIME | The start time of the period covered by this call in progress CDR (accurate to 1 second) |
| CIP_START_MILLISEC | The milliseconds portion of the CIP_START_TIME |
| CIP_END_TIME | The end time of the period covered by this call in progress CDR (accurate to 1 second) |
| CIP_END_MILLISEC | The milliseconds portion of the CIP_END_TIME |
| CORRELATION_ID | Sequences number for a correlated set of CDRs. Given a CDR that is a member of a correlated set, this can be used to find the other members of the correlated set. |
| CORRELATION_DUPLICATE_FLG | This flag indicates that this CDR is thought to be identical to another CDR within the set of CDRs to be correlated. |
| CORRELATABLE_FLG | This flag indicates that this CDR is thought to be complete enough to be included in the correlation processing. |
| ENRICHED_CALLING_NPA | Contains the CALLING_NPA to be used in the correlation process. Local number portability, number completion, etc can influence the contents of this column. |
| ENRICHED_CALLING_NXX | Contains the CALLING_NXX to be used in the correlation process. Local number portability, number completion, etc can influence the contents of this column. |
| ENRICHED_CALLING_LINE | Contains the CALLING_LINE to be used in the correlation process. Local number portability, number completion, etc can influence the contents of this column. |
| ENRICHED_CALLING_INT_NUM | Contains the calling digits to be used in the correlation process in the event they are thought to be an international number. Local number portability, number completion, etc can influence the contents of this column. |
| ENRICHED_CALLED_NPA | Contains the CALLED_NPA to be used in the correlation process. Local number portability, number completion, etc can influence the contents of this column. |
| ENRICHED_CALLED_NXX | Contains the CALLED_NPX to be used in the correlation process. Local number portability, number completion, etc can influence the contents of this column. |
| ENRICHED_CALLED_LINE | Contains the CALLED_LINE to be used in the correlation process. Local number portability, number completion, etc can influence the contents of this column. |
| ENRICHED_CALLED_INT_NUM | Contains the called digits to be used in the correlation process in the event they are thought to be an international number. Local number portability, number completion, etc can influence the contents of this column. |
| CORRELATION_CONFIDENCE | This parameter indicates the degree of confidence associated with the correlation of this CDR with other CDRs. This is a bit-wise parameter where each bit has a specific meaning. |
| CROSS_CORRELATION_ID | |

The term call detail record (CDR) refers to any electronic record of the details of a call including, for example, originating number (NPA/NXX), terminating number (NPA/NXX), time, duration, etc . . . What constitutes a CDR varies by vendor and customer.

Even within a single OSS family, different applications, such as billing, fraud detection, and business intelligence may direct the formation of CDRs with varying content. Further, there are several efforts at formulating standards from CDR content, such as ANSI standard TIA/EIA-124 Revision D for CDR content for wireless applications. The applicability of the present invention will remain regardless of the nomenclature, content and format of the electronic record that may vary from vendor to vendor and system to system.

In accordance with an embodiment of the present invention, the BI system 200 is improved by the addition of a new BI application (or modification to an existing BI application), which preferably operates in non-real-time (e.g. batch) mode, but may be operated in real-time mode. The new BI application identifies users of the network having certain characteristics that identify them as a certain type of user, for example a work-at-home user. It is to be understood, that while this embodiment of the present invention is being described as being integrated with the BI system 200, those of ordinary skill in the art will recognize that the present invention can be implemented as a stand-alone system. Further, while the present invention is described with respect to the use of CDRs, any data feed with the appropriate information may be utilized.

FIG. 3 is a flow chart of a method according to an embodiment of the present invention adapted to identify work-at-home users. In particular the method described in FIG. 3 is suitable for identifying work-at-homers that use dial-up ISPs. This can be potential valuable information for LECs that may wish to target such users with advertisements for other services such as DSL or a second line.

The method starts in step 300. In step 302, a set of ISP numbers is selected. This allows the requester to limit the subsequent report to a select number of ISPs. All ISPs on a network, or connected networks, can be identified using, for example, the ISP finder BI application discussed hereinabove available from Agilent Technologies, Inc. The set of ISP numbers can be limited to one or more ISPs of interest, or can be based on the NPA/NXX of the ISP or any other relevant factor. Of course, all identified ISPs can be selected.

Next, in step 304, the set of available CDRs is filtered based on the ISP numbers in the set. The output is a set of CDRs having CALLED_NPA, CALLED_NXX, and CALLED_LINE corresponding to one of the ISP numbers in the set. In step 306, the remaining CDRs are filtered to remove those with call origination times (using for example IAM_DATE_TIME) outside of normal business hours, such as 8:00 AM to 6:00 PM. In step 308, the remaining CDRs are filtered to identify those with a connect time of more than 4 hours (for example, the IAM_REL_DUR value which represent the difference between the release time and the call time).

Subsequently, in step 310, the CDRs remaining after the filters in steps 304 through 308 are analyzed to generate an exclusion list containing the calling numbers (i.e. CALLING_NPA; CALLING_NXX; and CALLING_LINE) that had connection time on the weekend. In step 312, the remaining CDRs are compared with the exclusion list and the CDR having originating numbers on the exclusion list are filtered out to leave those CDRs representing calls during business hours of greater than 4 hours to an identified ISP where the calling party did not connect on the weekend to the ISPs. Finally in step 314, by extracting the calling numbers from the remaining CDRs and eliminating duplicate entries a list of exclusive calling numbers is generated. This list of exclusive numbers may then be presented in a report to the requestor. The method end in step 316

TABLE 2 contains a procedure comprising a series of SQL commands that can produce a report in accordance with the example shown in FIG. 3. The commands in TABLE 2 take all daily CDR in a BI system and filters the lists to all local ISP terminated calls that have full 10-digit calling party number information. Then, it further filters the list such as only calls with connect time greater than 4 hours are included.

TABLE 2

```
SET ARRAY 100
SET ECHO OFF
SET FEED OFF
SET FLU OFF
SET HEA OFF
SET LIN 32767
SET PAGES 0
SET TERM OFF
SET TRIMS ON
SET VER OFF
DEF parallelism = 8
DEF tabspacename = 'STUDY'
DEF tabname = & 1.
DEF mmdd = &2.
DEF tmp_tab_1 = 'jh_wah_&&mmdd._1'
DEF tmp_tab_2 = 'jh_wah_&&mmdd._2'
DEF tmp_tab_3 = 'jh_wah_&&mmdd._3'
DEF spool_file_1 = 'wah_s1.txt'
DEF spool_file_2 = 'wah_s2.txt'
DEF spool_file_3 = 'wah_s3.txt'
DEF outfile = 'wah_&&mmdd.txt'
ALTER SESSION ENABLE PARALLEL DML;
ALTER SESSION SET optimizer_mode      = all_rows;
ALTER SESSION SET sort_area_size      = 104857600;
ALTER SESSION SET sort_area_retained_size = 104857600;
DROP TABLE &&tmp_tab_1.;
   spool &&spool_file_1.
```

TABLE 2-continued

```
CREATE TABLE &&tmp_tab_1.
    PARALLEL (DEGREE &&parallelism.) NOLOGGING PCTFREE 0 PCTUSED
99 TABLESPACE &&tabspacename.
    STORAGE (INITIAL 1M NEXT 1M PCTINCREASE 0 MAXEXTENTS
UNLIMITED) AS
SELECT /*+ PARALLEL (&tabname.,&&parallelism.) */
    TO_CHAR(iam_date_time,'D') dotw,
    TO_CHAR(iam_date_time,'HH24') hr,
    '('||enriched_calling_npa||')'||enriched_calling_nxx||'-'||enriched_calling_line cgpn,
    ia_called_state cd_st,
    ia_carrier_code ocn,
    ia_tgsn tgsn,
    anm_rel_dur/60 mou
FROM
    &tabname., tsdbi_dba.line_specific_current
WHERE
    enriched_called_npa||enriched_called_nxx||enriched_called_line=line_number
AND
    ia_call_category IN ('LOC','1S2LOC','2S2LOC','2S1LOC') AND
    length(enriched_calling_npa||enriched_calling_nxx||enriched_calling_line) = 10;
spool &&spool_file_2.
INSERT /*+ PARALLEL (&&tmp_tab_2.,&&parallelism.) */ INTO &&tmp_tab_2.
SELECT /*+ PARALLEL (&&tmp_tab_1.,&&parallelism.) */
    dotw,
    hr,
    cgpn,
    cd_st,
    ocn,
    tgsn,
    count(mou),
    sum(mou)
FROM
    &&tmp_tab_1.
HAVING
    avg(mou) > 3600
GROUP BY
    dotw, hr, cgpn, cd_st, ocn, tgsn;
spool off
DROP TABLE &&tmp_tab_1.;
--DROP TABLE &&tmp_tab_2.;
--DROP TABLE &&tmp_tab_3.;
EXIT
```

Figure 4:
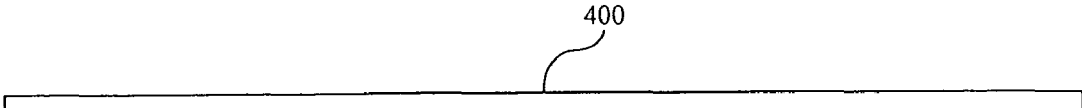
FIG. 4 is a screen shot of a report produced using a method in accordance with a preferred embodiment of the present invention.

FIG. 4 is a screen shot of a report produced using a method in accordance with a preferred embodiment of the present invention. The report shown in FIG. 4 is but one example of a report that could be produced in accordance with the described embodiment of the present invention. In particular the report in FIG. 4 shows the calling number, the date and time of the call, along with the minutes of use. Those of ordinary skill in the art will recognize that the report shown in FIG. 4 can be produced in a variety of manners, including the use of the CRYSTAL REPORTS software package.

Although a few variations of the preferred embodiment of the present invention have been shown and described, it will be appreciated by those skilled in the art that changes may be made to the described invention without departing from the principles and spirit of the invention, the scope of which is defined in the claims and their equivalents. For example, while the discussion herein has focused on the analysis of CDRs, those of ordinary skill in the art recognize that other data structures may be substituted, such as Correlated Call Records (CCRs) that combine of two or more CDRs representing the same call. Also, the terms applied to the various data structures and procedures do not represent any particular data structure or procedure. In particular, the present discussion was presented in the context of AGILENT's ACCESS7 and adopts the nomenclature thereof. However, the present invention is applicable to other systems, which may use different nomenclature to describe similar structures and to which the present invention may be equally applied. Further, the described procedures may also be modified to account for process flows other than the described process flow used by the AGILENT's ACCESS7 OSS.

What is claimed is:

1. A method of identifying work at home users of a telecommunications network, the method comprising:
   retrieving records describing phone calls;
   identifying phone numbers from the retrieved records that exhibit characteristics of work at home users;
   eliminating duplicate entries of exclusive phone calls from the identified phone numbers; and
   generating a list of the exclusive phone calls from the identified phone numbers after eliminating the duplicate entries.

2. A method, as set forth in claim 1, wherein the step of retrieving records comprises retrieving call detail records from a database.

3. A method, as set forth in claim 2, wherein the database is contained in a data management component.

4. A method, as set forth in claim 1, wherein the step of identifying phone numbers comprises selecting records describing calls to phone numbers of known Internet Service Providers.

5. A method, as set forth in claim 1, wherein the step of identifying phone numbers comprises excluding records describing calls less than a predetermined length of time.

6. A method, as set forth in claim 1, wherein the step of identifying phone numbers comprises excluding records containing originating numbers with records describing calls to an ISP that occur on weekends.

7. A method, as set forth in claim 1, wherein the step of identifying phone numbers comprises excluding records containing originating numbers with records describing calls to an ISP that occur outside normal business hours.

8. A method, as set forth in claim 1, wherein the step of identifying phone numbers further comprises:
- selecting records describing calls to phone numbers of known Internet Service Providers;
- excluding records describing calls less than a predetermined length of time;
- excluding records containing originating numbers with records describing calls to an ISP that occur on weekends; and
- excluding records containing originating numbers with records describing calls to an ISP that occur outside normal business hours.

9. A method, as set forth in claim 1, further comprising generating a list of ISP phone numbers for which associated call at homers are to be identified.

10. A system for identifying work at home users of a telecommunications network, the system comprising:
- a CDR feed that generates call detail records;
- means for identifying phone numbers from the call detail records that exhibit characteristics of work at home users;
- means for eliminating duplicate entries of exclusive phone numbers from the identified phone numbers; and
- means for generating a list of the exclusive phone numbers from the identified phone numbers after eliminating the duplicate entries.

11. A system for identifying work at home users of a telecommunications network, the system comprising:
- a CDR feed that generates call detail records;
- a storage device for storing the call detail records;
- an application in communication with the storage device that retrieves call detail records and identifies phone numbers from the retrieved call detail records that exhibit characteristics of work at home users;
- a device for eliminating duplicate entries of exclusive phone numbers from the identified phone numbers; and
- a generator device generating a list of the exclusive phone numbers from the identified phone numbers after eliminating the duplicate entries.

12. A system, as set forth in claim 11, wherein the application retrieves all call detail records for a certain timeframe from a database.

13. A system, as set forth in claim 12, further comprising a database management system associated with the storage device for managing the call detail records.

14. A system, as set forth in claim 11, wherein the application selects call detail records describing calls to phone numbers of known Internet Service Providers.

15. A system, as set forth in claim 11, wherein the application excludes call detail records describing calls less than a predetermined length of time.

16. A system, as set forth in claim 11, wherein the application excludes records containing originating numbers with records describing calls to an ISP that occur on weekends.

17. A system, as set forth in claim 11, wherein the application excludes records containing originating numbers with records describing calls to an ISP that occur outside normal business hours.

18. A system, as set forth in claim 11, further comprising a second application that identifies phone numbers of internet service providers.

19. A method for identifying phone numbers of interest, the method comprises:
- selecting records describing calls to phone numbers of known Internet Service Provides (ISP);
- excluding records from the selected records, the excluded records describing calls less than a predetermined length of time, containing originating numbers with records describing calls to an ISP that occur on weekends, and/or containing originating numbers with records describing calls to an ISP that occur outside normal business hours;
- eliminating duplicate entries of exclusive phone numbers from the excluded records; and
- generating a list of the exclusive phone numbers after eliminating the duplicate entries.

* * * * *